(12) United States Patent
Wang

(10) Patent No.: US 6,394,155 B1
(45) Date of Patent: May 28, 2002

(54) LOCKING DEVICE FOR A WOODEN PLANING MACHINE

(76) Inventor: Chin Feng Wang, 18F, 270, Chung Ming South Road, Taichung (TW)

( * ) Notice: Subject to any disclaimer, the term of this patent is extended or adjusted under 35 U.S.C. 154(b) by 0 days.

(21) Appl. No.: 09/556,184

(22) Filed: Apr. 21, 2000

(51) Int. Cl.$^7$ ................................................. B27C 1/02
(52) U.S. Cl. .................... 144/130; 144/117.1; 403/110; 403/343
(58) Field of Search ........................... 144/114.1, 117.1, 144/129, 130; 403/109.1, 110, 192, 343

(56) References Cited

U.S. PATENT DOCUMENTS

| | | | | |
|---|---|---|---|---|
| 5,771,949 A | * | 6/1998 | Welsh et al. ................. | 144/130 |
| 6,085,812 A | * | 7/2000 | Chiang ..................... | 144/117.1 |
| 6,089,286 A | * | 7/2000 | Liao ........................ | 144/117.1 |

* cited by examiner

Primary Examiner—W Donald Bray
(74) Attorney, Agent, or Firm—Troxell Law Office PLLC

(57) ABSTRACT

A locking device for a wooden planing machine is fixed on an upper surface of a machinery base combined movably with four posts located at four corners of a base of a wooden planing machine, including two brackets each located at two sides of the upper surface of the machinery base and having two sleeves separated with an opening on a bottom plate, a long drive shaft having two ends fixed with a cam located in the opening, and four tightening pins each passing through a coil spring placed in each of the sleeves and having its end fixed with a tightening member which is fixed with the end of each tightening pin and has a front concave surface to fit around the convex surface of the posts. Then a handle of the drive shaft is pressed down from an unlocked position to a locking position or vice versa, wherein the tightening pins are moved to tighten or loosen the tightening members against or from the posts to lock or unlock the machinery base.

3 Claims, 5 Drawing Sheets

LOCKING DEVICE FOR A WOODEN PLANING MACHINE

BACKGROUND OF THE INVENTION

This invention relates to a locking device for a wooden planing machine, particularly to one having a simple structure but surely locking stably a machinery base of a wooden planing machine and improving weakening of locking force caused by wear and tear of components in a conventional locking device for a wooden planing machine.

Conventional wooden planing machines generally have a machinery base combined movably up and down with four posts. And in order to increase stability. of the machinery base, there is a locking device provided between the machinery base and the posts, such as disclosed in U.S. Pat. No. 5,771,949.

However, the referred conventional case has comparatively many components not easily combined together, and the connect rods should have high precision so as to obtain effective locking operation. In addition, connect rods, springs and clamping members may be weakened in their locking force caused by wear and tear after a period of use.

SUMMARY OF THE INVENTION

One objective of the invention is to offer a locking device for a wooden planing machine, wherein. tightening pins are limited to move straight in sleeves, enabling the direction of movement quite accurate.

Another objective of the invention is to offer a locking device for a wooden planing machine, wherein a handle is only needed to press lower in case of the components having some wear and tear, then locking force of the device can be further effected, improving lowering of locking force that the conventional locking device has.

BRIEF DESCRIPTION OF DRAWINGS

This invention will be better understood by referring to the accompanying drawings, wherein.

DETAILED DESCRIPTION OF THE PREFERRED EMBODIMENTS

Figure 1:
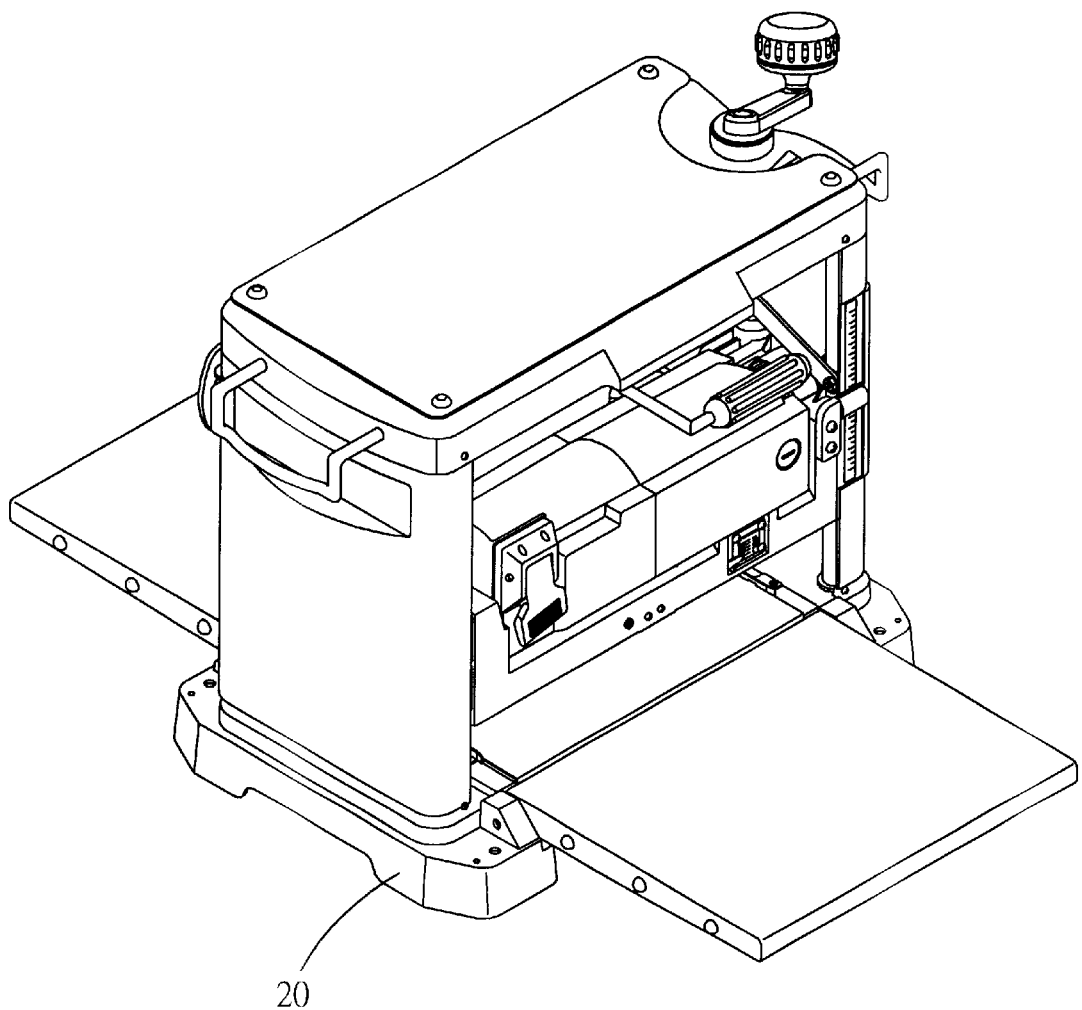
FIG. 1 is a perspective view of a wooden planing machine provided with a locking device in the present invention.
Figure 2:
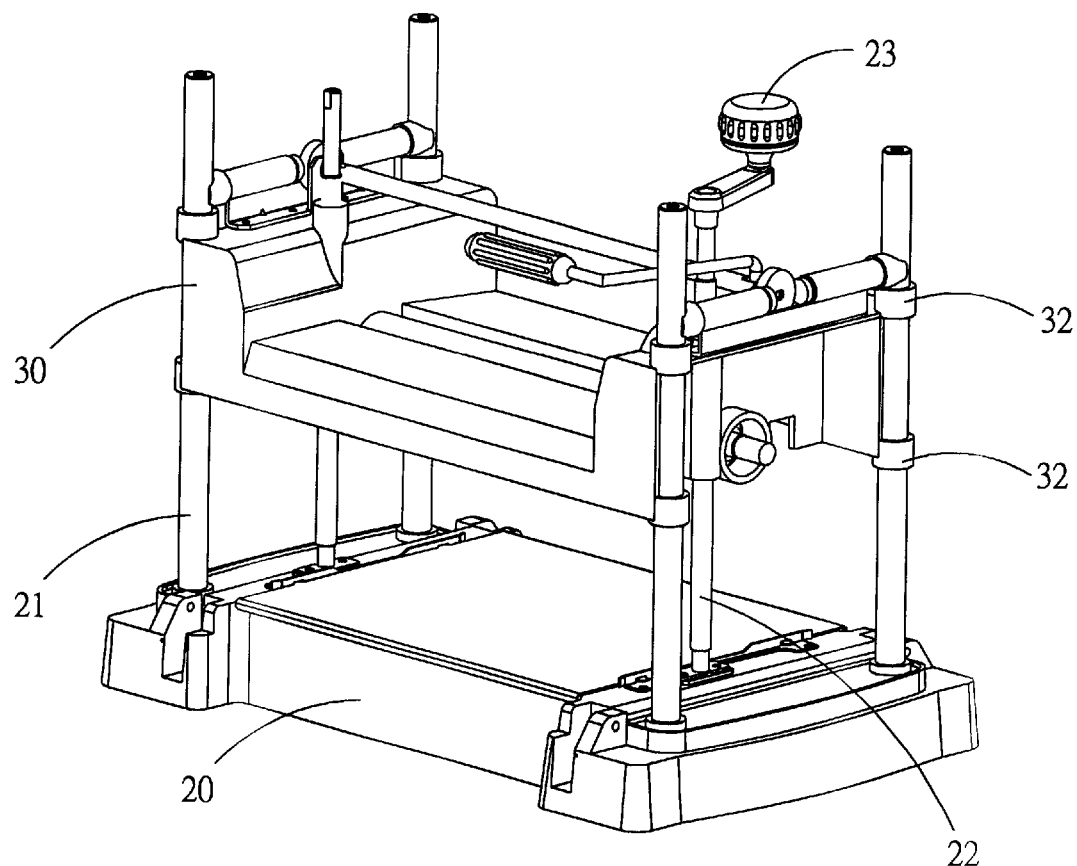
FIG. 2 is a partial perspective view of the locking device for a wooden planing machine in the present invention.
Figure 3:
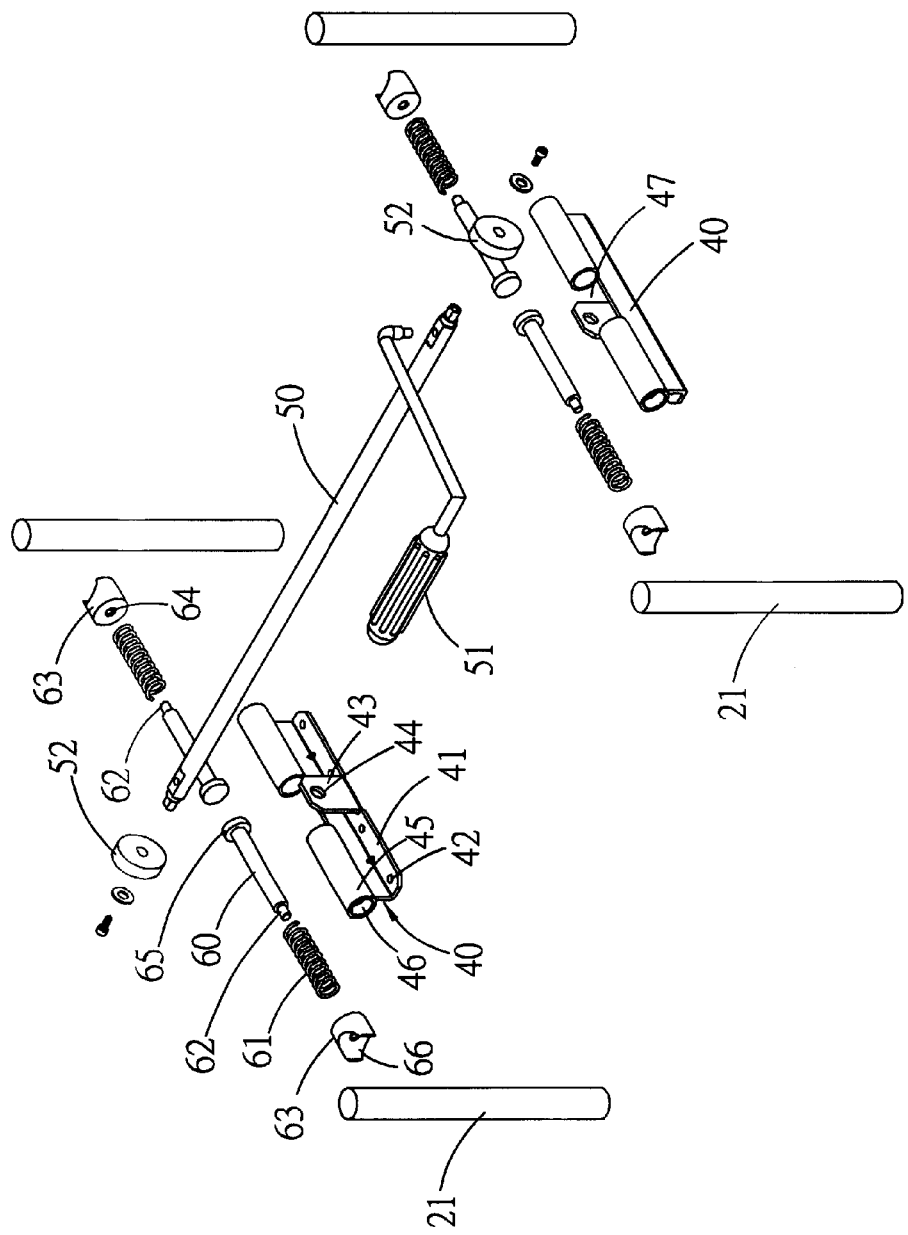
FIG. 3 is a partial exploded perspective view of the locking device for a wooden planing machine in the present invention.

A first embodiment of a locking device for a wooding planing machine in the present invention, as shown in FIG. 1, includes four posts 21 at the four corners of a base 20 of a wooden planing machine, a machinery base 30 combined with the four posts 21 by means of two rings 32 fixed on each post 21, an elevating rod 22 screwed with an intermediate section of two sides of the machinery base 30 (not illustrated in Figures), a handle 23 operated to lift and lower the machinery base 30. These components are the same as the conventional art, minutely described.

What is improved in the invention is as follows.

A locking device is provided on an upper surface of the machinery base 30, including two brackets 40, a long drive shaft 50, and four locking pins 60.

The two brackets 40 respectively have a bottom plate 41 with holes 42 fixed on two opposite sides of the upper surface of the machinery base 30 with screws, a vertical fix plate 43 extending upright on an intermediate section of the bottom plate 41 and having a shaft hole 44 laterally bored, a sleeve 45 respectively provided on a front portion and a rear portion of each bracket 40 and having a center hole 46 aligned to the two—a front and a rear—posts 21. The two sleeves 45 are separated with an opening 47 of a certain distance for another component.

Figure 4:
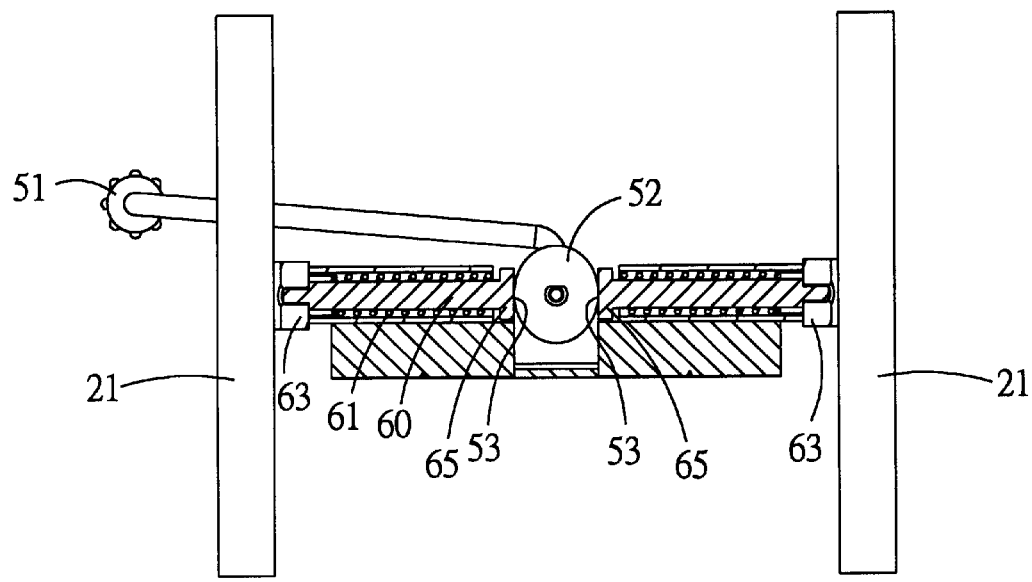
FIG. 4 is a cross-sectional view of the locking device being in an unlocked position in the present invention.

The long drive shaft 50 has two ends fitted in the shaft holes 44 of the two fix plates 43, and a handle 51 is combined with the drive shaft 50 to rotate the drive shaft 50. An eccentric metal cam 52 is fixed respectively at two ends of the drive shaft 50, as shown in FIG. 4, in the opening 47 between the two sleeves 45 located at an outside of the fix plate 43. The eccentric cam 52 has a short horizontal radius portion 53 for unlocking and a long vertical radius portion for locking the machinery base 30.

The four locking pins 60 has a fix end 62 and a head 65, passing through a coil spring 61, with the fix end 62 fitting firmly in a center hole 64 of a tightening member 63 after each locking pin 60 passes through each sleeve 45 and the head 65 is stopped at the end of the sleeve 45. The tightening member 63 is located at the outer end of each sleeve 45, having a front concave surface 66 to fit around the convex surface of each post 21.

Next, as shown in FIG. 4, when the handle 51 is not pressed down and is in an unlocked position, the eccentric cam 52 has the right side and the left side of the short horizontal radius portion respectively contacting the heads 65 of the front and the rear tightening pins 60 and permitting the coil springs 61 push the heads 65 of the tightening pins 60 towards the eccentric cam 52 and forcing the front concave surfaces 66 of the tightening members 63 separate from the posts 21 to permit the machinery base 30 move up and down along the posts 21.

Figure 5:
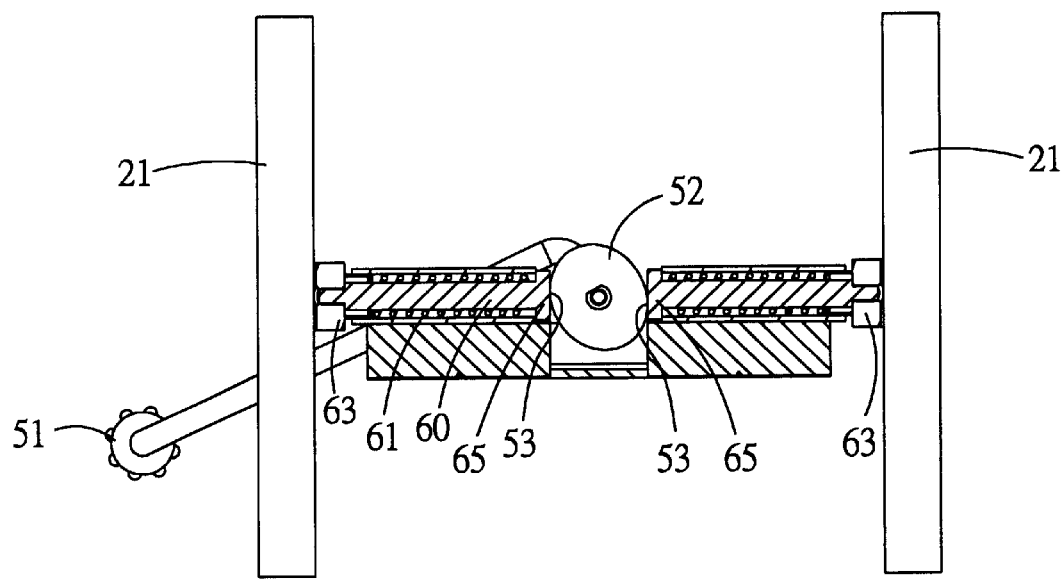
FIG. 5 is a cross-sectional view of the locking device being in a locked position in the present invention; and, FIG. 6 is a cross-sectional view of a second embodiment of a locking device for a wooden planing machine in the present invention.

After the machinery base 30 is adjusted in its position, as shown in FIG. 5, it can be locked at the adjusted position by pressing down the handle 51 to a locking position, forcing the long vertical radius portion of the eccentric cam 52 to rotate a little and press the heads 65 of the front and the rear tightening pins 60 outward so that the front concave surfaces 66 of the tightening members 63 move forward to tightly rest against the posts 21, locking the machinery base 30 immovable.

Figure 6:
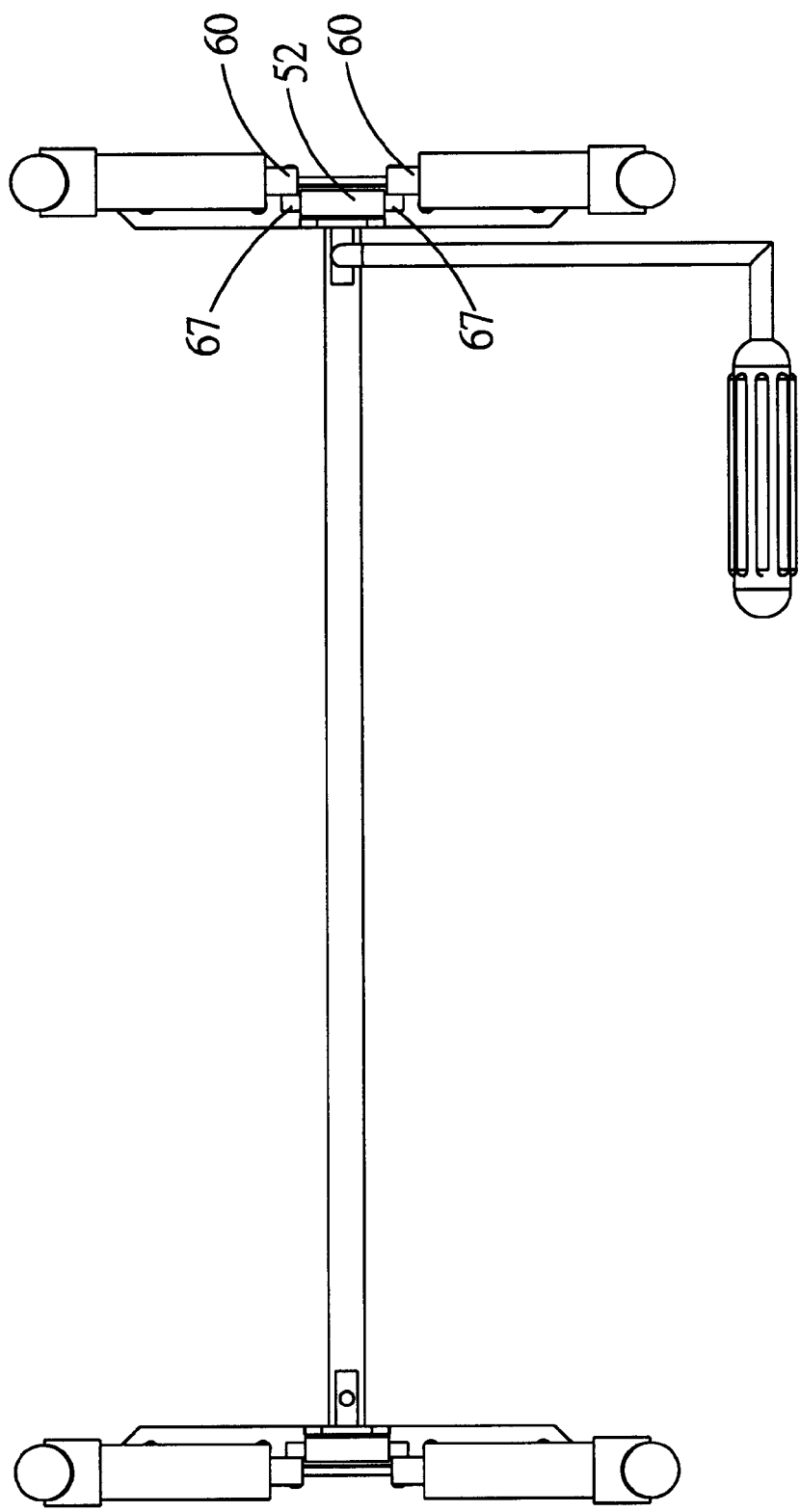

A second embodiment of a locking device for a wooden planing machine is shown in FIG. 6, having the heads of the tightening pins 60 combined with a lateral screw 67, and the eccentric cam 52 tightly rests against the lateral screws 67 f or moving the tightening pins 60.

Next, how the components act and what effect they have will be described as follows.

The tightening pins 60 are respectively limited to move straight in the sleeves 65, so its moving direction is quite accurate, having no troubles as those in combining the connect rods with other components in the conventional locking device for a wooden planing machine.

The eccentric cam 52 utilizes the long vertical radius portion for pressing outward the heads 65 of the tightening pins 60, and it is made of metal, very durable to resist wear and tear. Should the cam 52 wear, the handle 51 can be pressed down lower than usual to force the long vertical radius portion press the heads 65 of the tightening pins 60. Thus the phenomenon of weakening of the locking force in the conventional wooden planing machine is improved in the present invention.

While the preferred embodiments of the invention have been described above, it will be recognized and understood that various modifications may be made therein and the appended claims are intended to cover all such modifications which may fall within the spirit and scope of the invention.

What is claimed is:

1. A locking device for a wooden planing machine, positioned on an upper surface of a movable machinery base movably mounted on four posts provided at four corners of a fixed base, said locking device comprising:

two brackets respectively fixed at two opposite sides of an upper surface of said movable machinery base, each bracket having spaced apart sleeves respectively on a front portion and a rear portion and separated by an opening;

a long drive shaft having two opposite ends respectively rotatably connected to said two brackets, a handle extending from the drive shaft, and an eccentric cam respectively fixed to each opposite end of said drive shaft, said cam located in said opening of each bracket, each eccentric cam having a short radius portion and a long radius portion;

four tightening pins, each respectively passing through a coil spring in each of said sleeves, each tightening pin having an end fixed with a tightening member after passing through said sleeve and a head located in said opening and in contact with the eccentric cams, each of said tightening members being located at an outer side of said sleeve and having a front concave surface to fit around an outer convex surface of one of said posts; whereby, said eccentric cams have said short radius portions in contact with the heads of the tightening pins, said coil springs elastically move said tightening pins inwardly to separate said front concave surfaces of said tightening pins from said posts when said handle is placed in an unlocking position, and whereby said eccentric cams have said long radius portions in contact with said heads to move said tightening pins outwardly to thereby move said front concave surfaces of said tightening members to fit tightly around the convex outer surfaces of said posts, and locking said movable machinery base when said handle is pressed down to a locking position from the unlocking position.

2. The locking device for a wooden planing machine as claimed in claim 1, wherein said brackets each respectively have a bottom plate, and a vertical fix plate formed on an intermediate section of said bottom plate and having a lateral shaft hole, wherein said long drive shaft has two ends respectively fitting in said lateral shaft holes of said vertical fix plates.

3. The locking device for a wooden planing machine as claimed in claim 2, wherein said brackets each respectively have holes in said bottom plate for fixing said brackets to the upper surface of said machinery base.

* * * * *